US011941717B2

(12) United States Patent
Rojas Calderón et al.

(10) Patent No.: US 11,941,717 B2
(45) Date of Patent: Mar. 26, 2024

(54) LIQUIFIED PETROLEUM GAS DELIVERY VEHICLE COMPRISING REMOTELY CONTROLLED AND ENCRYPTED AUTHORIZED DISPENSING TO STATIONARY STORAGE TANKS

(71) Applicants: EDISON EFFECT COMPANY SAPI DE CV, San Luis Potosí (MX); CONTROLES VOLUMÉTRICOS ENERGÉTICOS SA DE CV, Cdmx (MX)

(72) Inventors: José Luis Rojas Calderón, San Luis Potosí (MX); Pedro Gabay Villafaña, San Luis Potosí (MX); Agustin Gabriel Rojas Calderón, San Luis Potosí (MX)

(73) Assignees: EDISON EFFECT COMPANY SAPI DE CV (MX); CONTROLES VOLUMÉTRICOS ENERGÉTICOS SA DE CV (MX)

( * ) Notice: Subject to any disclaimer, the term of this patent is extended or adjusted under 35 U.S.C. 154(b) by 80 days.

(21) Appl. No.: 17/238,619

(22) Filed: Apr. 23, 2021

(65) Prior Publication Data

US 2021/0334927 A1    Oct. 28, 2021

(30) Foreign Application Priority Data

Apr. 23, 2020    (MX) .................. MX/A/2020/004235

(51) Int. Cl.
*G06Q 50/28*      (2012.01)
*B60P 3/22*       (2006.01)
(Continued)

(52) U.S. Cl.
CPC .............. *G06Q 50/28* (2013.01); *B60P 3/228* (2013.01); *G01F 15/005* (2013.01);
(Continued)

(58) Field of Classification Search
CPC .. G06Q 5/28; G06Q 10/06313; G05B 19/416; B60P 3/228; H04W 4/38; H04W 4/44
See application file for complete search history.

(56) References Cited

U.S. PATENT DOCUMENTS 4,189,005 A * 2/1980 McLoughlin .......... A62C 27/00
                                                    700/282
4,782,451 A * 11/1988 Mazzarella ........... G01F 23/802
                                                   340/870.16
(Continued)

FOREIGN PATENT DOCUMENTS

CA           2493307 A1      7/2006

OTHER PUBLICATIONS

Padgette, John et al., Guide to Bluetooth Security National Institute of Standards and Technology, Revision 1, Jun. 2012 (Year: 2012).*
(Continued)

*Primary Examiner* — Scott L Jarrett
(74) *Attorney, Agent, or Firm* — Ward Law Office LLC; Jacob M. Ward

(57) ABSTRACT

Fluid supply, monitoring and control system from LPG supply vehicles to tank trucks, the vehicle has a LPG liquid level gauger, an output line over which it is located in a fluid way a solenoid valve which allows or cuts the LPG flow besides of a flowmeter which measures the amount that flows through the said output line, a fluid coupled hose to the said output line with a connector which allows to safely couple to a stationary tank; the system also includes the use of a mobile computer device, a central that has at least one desktop computer device connected to a WIFI data network of mobile phone data network with which it communicates with the mobile device. The said level gauge is electronically coupled to a first manager which includes an electronic card, a processor, as well as the first antenna which allows to send data via Bluetooth to the mobile computer device;

(Continued)

the said solenoid valve is electronically coupled to a second manager which includes an electronic card, a processor, energizing means or to re-energize the solenoid valve as well as a second antenna which allows to receive and send data via Bluetooth to the mobile computer device; besides, the said flowmeter is electronically coupled to a third manager which includes an electronic card, a processor, as well as a third antenna which allows to send data via Bluetooth to the mobile computer device; where the mobile computer device receives information from the level gauge and flowmeter which compares at all times when LPG is been delivered, can also send the encrypted instruction to open or close the solenoid valve, according to the collates of the data received from the sensors and the geographical location of the mobile computer device.

10 Claims, 2 Drawing Sheets

(51) Int. Cl.
| | | |
|---|---|---|
| *G01F 15/00* | (2006.01) | |
| *G01F 15/061* | (2022.01) | |
| *G01F 23/62* | (2006.01) | |
| *G05B 19/416* | (2006.01) | |
| *G05D 7/06* | (2006.01) | |
| *G06F 21/60* | (2013.01) | |
| *G06Q 10/0631* | (2023.01) | |
| *G06Q 10/10* | (2023.01) | |
| *G06Q 50/06* | (2012.01) | |
| *H04W 4/38* | (2018.01) | |
| *H04W 4/44* | (2018.01) | |

(52) U.S. Cl.
CPC .......... *G01F 15/061* (2013.01); *G01F 23/62* (2013.01); *G05B 19/416* (2013.01); *G05D 7/0635* (2013.01); *G06F 21/602* (2013.01); *G06Q 10/06313* (2013.01); *G06Q 10/103* (2013.01); *H04W 4/38* (2018.02); *H04W 4/44* (2018.02); *G05B 2219/37371* (2013.01); *G06Q 50/06* (2013.01)

(56) References Cited

U.S. PATENT DOCUMENTS

| | | | | | |
|---|---|---|---|---|---|
| 4,845,486 | A | * | 7/1989 | Knight | H04M 11/002 73/317 |
| 5,154,314 | A | * | 10/1992 | Van Wormer | G06Q 10/087 235/94 R |
| 5,263,824 | A | * | 11/1993 | Waldbeser | A62C 2/04 417/63 |
| 5,351,725 | A | * | 10/1994 | Suthergreen | G01F 23/802 73/299 |
| 5,420,797 | A | * | 5/1995 | Burns | G06Q 10/047 222/23 |
| 5,454,408 | A | * | 10/1995 | DiBella | F17C 13/02 141/47 |
| 5,579,233 | A | * | 11/1996 | Burns | B67D 7/145 700/240 |
| 5,602,745 | A | * | 2/1997 | Atchley | B67D 7/222 222/37 |
| 5,913,180 | A | * | 6/1999 | Ryan | G06Q 50/06 705/413 |
| 5,983,198 | A | * | 11/1999 | Mowery | G06Q 10/08 705/16 |
| 6,336,362 | B1 | * | 1/2002 | Duenas | G01F 15/063 73/313 |
| 6,529,800 | B1 | * | 3/2003 | Johnson | G07F 13/025 700/244 |
| 6,571,151 | B1 | * | 5/2003 | Leatherman | B67D 7/145 700/282 |
| 6,715,514 | B2 | * | 4/2004 | Parker, III | G06Q 10/08 141/1 |
| 6,931,305 | B2 | * | 8/2005 | Sherwood | G05D 7/0635 700/282 |
| 7,126,464 | B2 | * | 10/2006 | Harvey | B60P 3/227 340/471 |
| 7,155,349 | B1 | * | 12/2006 | Souluer | G01F 23/366 702/55 |
| 7,188,771 | B2 | * | 3/2007 | Poulter | B67D 7/346 235/375 |
| 7,292,993 | B2 | * | 11/2007 | Uzzo | G06Q 20/203 705/28 |
| 7,546,256 | B2 | * | 6/2009 | Hillam | B67D 7/085 705/28 |
| 7,574,385 | B2 | * | 8/2009 | Hillam | G06Q 20/203 705/28 |
| 7,805,340 | B2 | * | 9/2010 | Blakeslee | B67D 7/08 705/28 |
| 8,180,336 | B2 | * | 5/2012 | Wesby | H04W 4/20 455/406 |
| 8,386,283 | B2 | * | 2/2013 | Hand | G06Q 10/047 705/7.42 |
| 8,905,089 | B2 | * | 12/2014 | Evans | B67D 7/348 141/94 |
| 9,268,911 | B2 | * | 2/2016 | Sia | G16H 40/67 |
| 9,523,978 | B2 | * | 12/2016 | Lichtash | G05B 19/042 |
| 9,582,837 | B2 | * | 2/2017 | Wada | G07C 9/27 |
| 9,787,950 | B2 | * | 10/2017 | King | H04N 7/183 |
| 9,878,897 | B2 | * | 1/2018 | Rogers | B67D 7/04 |
| 9,945,800 | B2 | * | 4/2018 | Rebinsky | G01N 25/18 |
| 9,969,604 | B2 | * | 5/2018 | Koeninger | B67D 7/04 |
| 10,273,138 | B2 | * | 4/2019 | Koeninger | B67D 7/348 |
| 10,280,066 | B2 | * | 5/2019 | Bonvino | F17C 13/00 |
| 10,306,189 | B2 | * | 5/2019 | King | G07F 13/025 |
| 10,401,880 | B2 | * | 9/2019 | Darrow | F04B 17/05 |
| 10,579,839 | B1 | * | 3/2020 | Johansson | G06K 7/10297 |
| 10,620,080 | B2 | * | 4/2020 | Murakami | G01M 3/28 |
| 10,711,787 | B1 | * | 7/2020 | Darley | F04D 29/4293 |
| 10,830,031 | B2 | * | 11/2020 | Shock | B62D 63/08 |
| 10,881,046 | B2 | * | 1/2021 | Tribelhorn | A01M 7/0089 |
| 10,896,427 | B2 | * | 1/2021 | Grinberg | G06Q 30/08 |
| 10,909,521 | B2 | * | 2/2021 | An | B60R 1/00 |
| 10,922,763 | B2 | * | 2/2021 | Torpy | G06F 9/3836 |
| 10,997,544 | B1 | * | 5/2021 | Bar-Zeev | B64F 1/18 |
| 11,519,770 | B1 | * | 12/2022 | Morris | G06Q 50/06 |
| 2002/0188382 | A1 | * | 12/2002 | Sherwood | G05D 7/0635 700/282 |
| 2003/0065422 | A1 | * | 4/2003 | Johnson | G07F 13/025 700/241 |
| 2004/0162850 | A1 | * | 8/2004 | Sanville | G05B 15/02 |
| 2006/0157145 | A1 | * | 7/2006 | Hillam | G06Q 20/203 141/198 |
| 2006/0157147 | A1 | * | 7/2006 | Hillam | G06Q 20/203 141/198 |
| 2006/0157150 | A1 | * | 7/2006 | Blakeslee | G06Q 10/087 141/198 |
| 2006/0272830 | A1 | * | 12/2006 | Fima | G01M 3/186 169/16 |
| 2007/0074782 | A1 | * | 4/2007 | Fiore | G01F 23/72 141/83 |
| 2008/0223926 | A1 | * | 9/2008 | Miller | G07C 9/37 235/382 |
| 2009/0035121 | A1 | * | 2/2009 | Watson | F01C 1/126 73/861.87 |
| 2009/0221240 | A1 | * | 9/2009 | Zhang | H04B 5/00 455/574 |
| 2009/0224937 | A1 | * | 9/2009 | Gillette | G01D 4/002 340/870.02 |
| 2009/0243863 | A1 | * | 10/2009 | Lease | G01F 23/804 340/618 |
| 2010/0057382 | A1 | * | 3/2010 | Li | G05B 19/042 702/47 |
| 2011/0004764 | A1 | * | 1/2011 | Stuber | G01D 4/004 713/176 |

(56) References Cited

U.S. PATENT DOCUMENTS

| | | | |
|---|---|---|---|
| 2011/0040689 A1* | 2/2011 | Neri-Badillo | G06Q 30/0283 235/380 |
| 2011/0066297 A1* | 3/2011 | Saberi | H04Q 9/00 700/287 |
| 2011/0172816 A1* | 7/2011 | Ezra | B67D 7/348 700/237 |
| 2012/0232750 A1* | 9/2012 | Leigh | G06Q 10/06 137/391 |
| 2013/0232019 A1* | 9/2013 | Frieden | G07F 13/025 705/17 |
| 2014/0231531 A1* | 8/2014 | van der Donk | F23N 5/184 237/2 R |
| 2014/0267741 A1* | 9/2014 | King | G07F 13/025 348/156 |
| 2015/0046298 A1* | 2/2015 | Zwakhals | G06Q 10/087 705/28 |
| 2015/0363896 A1* | 12/2015 | Wada | G07C 9/27 705/317 |
| 2016/0171439 A1* | 6/2016 | Ladden | G06T 7/0004 705/340 |
| 2016/0290838 A1* | 10/2016 | Mudireddy | H04L 9/3226 |
| 2017/0023503 A1* | 1/2017 | Rebinsky | F02D 41/0027 |
| 2017/0073211 A1* | 3/2017 | Wilson | B67D 7/348 |
| 2017/0174501 A1* | 6/2017 | Dudar | B67D 7/0492 |
| 2018/0035083 A1* | 2/2018 | King | G07F 7/0893 |
| 2018/0121863 A1* | 5/2018 | Lin | G06Q 10/083 |
| 2019/0025108 A1* | 1/2019 | Jones | G06Q 20/20 |
| 2019/0056754 A1* | 2/2019 | Darrow | B64F 1/28 |
| 2019/0385153 A1* | 12/2019 | Cui | G01F 15/063 |
| 2020/0040716 A1* | 2/2020 | Clyburn | E21B 21/02 |
| 2020/0187407 A1* | 6/2020 | Stovall | A01B 29/048 |

OTHER PUBLICATIONS

Tank Truck Products and Systems FMC Technologies Measurement Solutions, Inc., 2007 (Year: 2007).*

Electronic Fuel Management System OPW, 2015 (Year: 2015).*

Sening TruckEye FMC Technologies, Inc., 2022 (Year: 2022).*

Senning—Innovative tank truck systems FMC Technologies, Inc., Oct. 2020 (Year: 2020).*

Remote Control and Overfill Prevent Amplifier—MultiControl—Instruction Manual FMC Technologies, Inc., Jan. 2013 (Year: 2013).*

Sening MultiLevel—Level Gauging System FMC Technologies, Aug. 2009 (Year: 2009).*

Sening MultiFlow—Metered delivery FMC Technologies, Inc., Oct. 2020 (Year: 2020).*

Electronic Register MultFlow—Instruction Manual FMC Technologies, Inc., Feb. 2013 (Year: 2013).*

* cited by examiner

LIQUIFIED PETROLEUM GAS DELIVERY VEHICLE COMPRISING REMOTELY CONTROLLED AND ENCRYPTED AUTHORIZED DISPENSING TO STATIONARY STORAGE TANKS

TECHNICAL FIELD

This invention is related with the distribution means of consumer goods such as fluids, as can be Liquified Petrol Gas "LPG", which intends to optimize the use of resources for the supply, distribution and refilling of LPG in stationary tanks by means of a method and device which can ensure that the vehicle is in the correct address provided by the client, conducting as well a monitoring and matching process from the content of the vehicle, versus the LPG mass flow supplied to the stationary tank, making safer the operation of discharge from the vehicle to the stationary tank, because leaks can be detected and also it is possible to guarantee the client that the LPG volume for which they have charged is the same it has been supplied, also the method allows to design a supply route in advance and this helps to avoid the wear both from the vehicle and the crew in it.

BACKGROUND

The fluid distribution system (Liquified Petrol) can be more efficient and safer, because it is easier to notice the tank trucks or tanker trucks, transporting this vital but dangerous supply throughout all cities, and criss-crossing from one side to the other as if they were cabs; using the technology available to them, in some cases there is a central computing station to which one can call to place an order, the central computing station locates a vehicle and sends it to the address, it would be great if the central computing station had a system with which they could know where a vehicle is and if it is busy dispatching; but it is not like that, in the best scenario they sent a message via radio and vehicle operator which is not busy at the time takes the order, no matter if it is in the opposite side of the city; and this causes inefficiency in the use of resources since it implies that the vehicles are "rolling" unnecessary all day long, besides the fatigue, stress and long working hours for the operators.

Another important issue to be considered is the user's or client's safety, because it is always uncertain knowing how many liters have been supplied on one's stationary tank, as well as at what time the vehicle will arrive to dispatch, and the identity of the operators; all of this because currently when one places a refill order it is necessary to wait until the unit is available and it arrives to the address, which can take up to several hours; another scenario is when we have a proactive user who has noticed that the fuel level in the stationary tank is low, and requests the refill service in advance hoping that the central computing station will have time to schedule the supply within a "route", which does not happen since it is only added to a supply list, being the supply time uncertain because the vehicles with fluid leave for the road with their "list" but they continue doing refills according to the demand on the street, which causes that the refill time would be totally uncertain; this directly affects the user or client since he is unable to continue with his daily activities because he has to wait for the vehicle, and once it arrives to the address, the user does not know if it is a fake unit which dispatched stolen fuel, or if the operators intend to assault him, or stole some liters from the refill, or over charge him and most important, that they are qualified personnel who know what they are doing because they can cause a very serious accident; guarantees all of the above which must be provided to the user or client when refilling his stationary tank.

Thus, several efforts have been developed in the status of the technique which can, by itself, can solve some of the abovementioned problems, the document: CA 2493307 from Hillam et. al. where it is stated the use of data bases, computers and tracking devices for the distribution of fuels; the method suggests the tracking of the fuel units between the distribution points, in a way such that the inventory of fuel can be handled in each distribution point as well as the "tonnage" or conciliation of measured liquid volumes versus volumes stored and registered in the central system of the inventory management. In an embodiment, the invention turns to an inventory monitoring central system "CIM", which has a list of the orders as well as the authorizations for discharge in the relevant tanks; before the supply of the product, the operator requests and receives authorization for the discharge of a CIM product, sending authorization data to the operator, place for the discharge to be done, the operator provides information to CIM regarding the arrival ticket for example: type of product, density, temperature of the product in the warehouse, net volume, volume modified by temperature, etc. The operator can also provide information about the supplier, terminal, container, driver's information, etc. In some modalities, the operator can provide all of this information electronically through a portable computer device placed in the tractor unit which wireless communicates with CIM. The system (CIM) can also gran authorization to ensure that the product arrives to the correct tank, and thus the receiving tank is identified, and also sends information on real time from the filling of the receiving tank. In another embodiment, the system can activate a solenoid flux valve placed in the vehicle, or transport tank, which will be activated when CIM notices that content is been discharged in the wrong receiving tank. In another embodiment, CIM can also conduct "tonnage" or conciliation tasks, this is to check that the volume discharged to the vehicle or transport tank matches the volume retrieved from the warehouse, as well as that the volume discharged to the vehicle or transport tank matches with the volume dispatched in the receiving tanks.

Another interesting document in the state of the art is U.S. Pat. No. 9,523,978 from Lichtash, which revolves around an electronic system which remotely controls a disc valve where the referred disc moves from the open to the closed position, the valve has an engine mechanically coupled to the disc, a controller regulates the engine which opens and closes the disc; the valve can also include sensors which allow to know if the valve is opened or closed; the system has as well a pipeline descent elbow sensor which communicates with the controller and operates together with the valve; the system can prevent the non-authorized discharge in a receiving tank by means of a command control unit attached to the pump, programmed to authorize the communication between the controller of the valve to conduct an authorized operation.

Another interesting document in the state of the art is document US2015/0046298 from Zwakhals et. al. in which a system and a method for the monitoring of deliveries are described, where the system uses a computer processor, in which the method includes receiving information in real time during the supply of the material, one of the data updated in real time can be the amount of product delivered; a related data base is updated to reflect the amount of product delivered; the system compares and collates the information received versus the stored information, as well as the consistency that the dispatched material has arrived to its due container, as well as the volumes and thus the emptied volume from the vehicle or mobile tank is collated with what it has been transferred to the receiving reservoir; and the system collates the information received from both sensors. The system can also create a supply agenda, upon being able to receive the requirements from the client, which helps to plan the routes since the client can define the point of supply; the system can also stop the emptying or transfer of goods to be delivered, in the event of finding severe discrepancies in the collected data.

Another interesting document of the state of the art is document US2018/0121863 from Fon Chi; where it is described a system of supply of tanks with fluid, by means of supply vans, the system uses an electronic computer device, which can be operated in three ways, the instant embodiment, the agenda embodiment and the client pick-up embodiment; in the first embodiment, the client places a gas tank order, the system verifies that the supply van is the correct one, as well as the information of the sold cylinder (cost, cate, time, cylinder specification); in the second embodiment, a pre-order is generated with which the discounts are calculated as well as the route for the supply van, also the system verifies the specification of the cylinder as well as its cost; in the third embodiment, the system locates which van is the appropriate according to the supply agenda, places a supply for the cylinder to be collected by the client, as well as the discounts, also generates the notifications to the client regarding the collection of the cylinder, the cylinder also registers information of the same cylinder as well as its cost.

BRIEF DESCRIPTION OF THE INVENTION

From the study of the abovementioned documents, it can be implied that none of them covers completely the problem posed, in part because the reality of the fluid market differs both in uses and costumes with other countries, so a solution which can adequate to the Mexican market would be preferable; hence, ne of the purposes of this invention herein was to provide a fluid supply system through vehicles with fluid to stationary tank both of domestic and commercial or industrial use, where the system is based in a processor placed in a mobile computer device like a "tablet" or "intelligent cell phone" or mobile computing, which is able to communicate with several devices wirelessly; the system controls remotely through the mobile computing device the opening and closing of the solenoid valve which allows or restricts the flow of fluid to the stationary tank, also received information in real time from a flow meter or flowmeter of the output passing through the hose and which is been dispatched from the vehicle to the stationary tank, also receives information from a level sensor placed in the vehicle, which allows to collate that the flow passing through the hose of the vehicle connected in the stationary tank matches the volume emptied from the vehicle, and so the system can verify that the right volume of fluid is dispatched to the client's stationary tank. The system is also in communication with a central computing station, which keeps and analyzes the data sent by the mobile computing device, as location of the vehicle, volume dispatched, operator, besides granting the authorizations for connection and discharge by sending encrypted codes which allow the operation of the solenoid valve which allows the flow from the vehicle to the stationary tank, where the system also monitors if the transfer of the fluid between reservoirs is done adequately, because if the flow is not within the predetermined safety parameters, the system determines the closing of the solenoid valve, stopping the transfer of fluid and showing a signal and display of alarm in the mobile computing device. In an alternative embodiment of the system, it can also calculate the supply route, which avoids that the vehicles are rolling meaninglessly around the city, which makes more efficient the use of the vehicle and its crew.

DETAILED DESCRIPTION OF THE INVENTION

Figure 1:
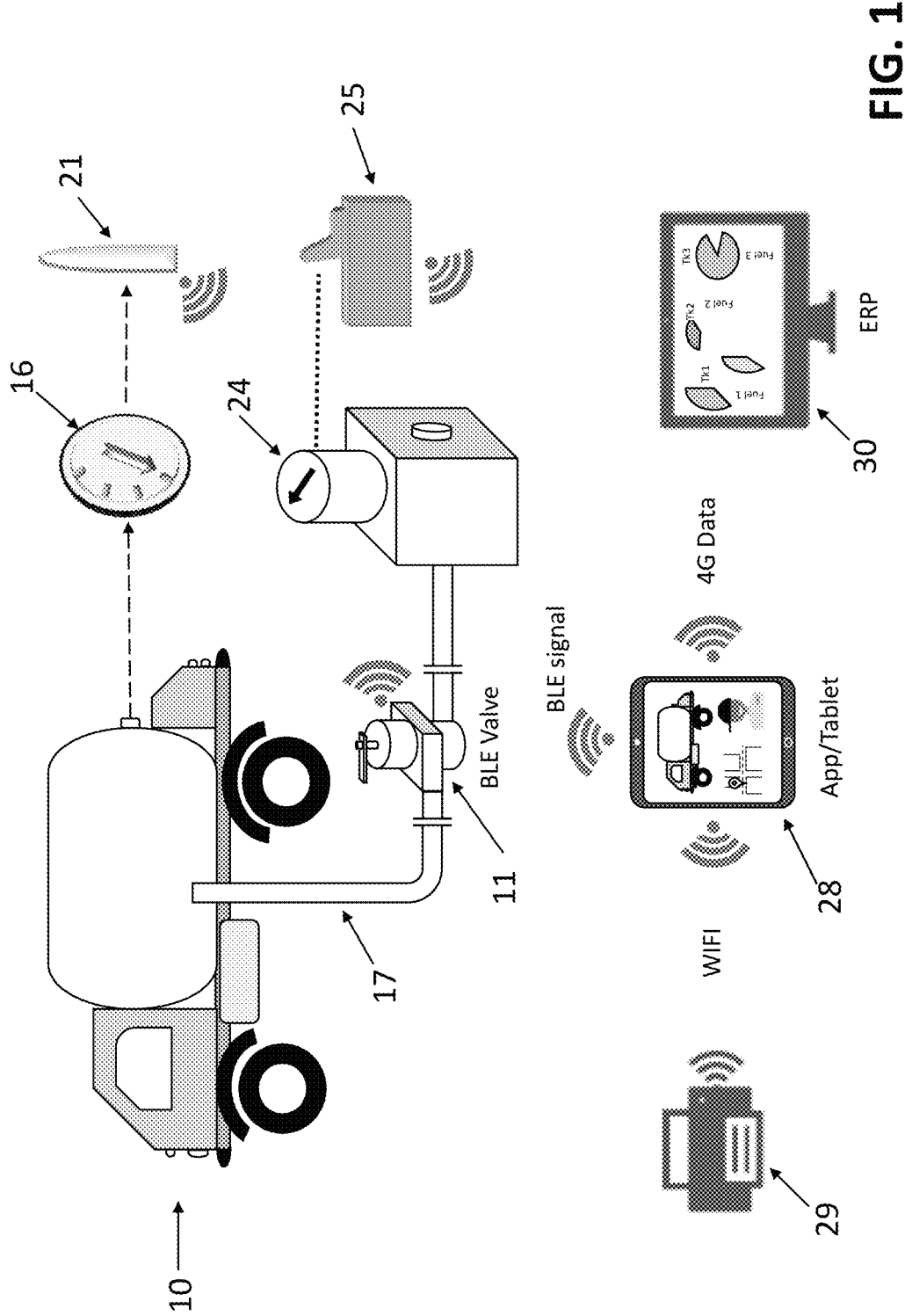
FIG. 1 is a diagram showing the main elements of the invention.
Figure 2:
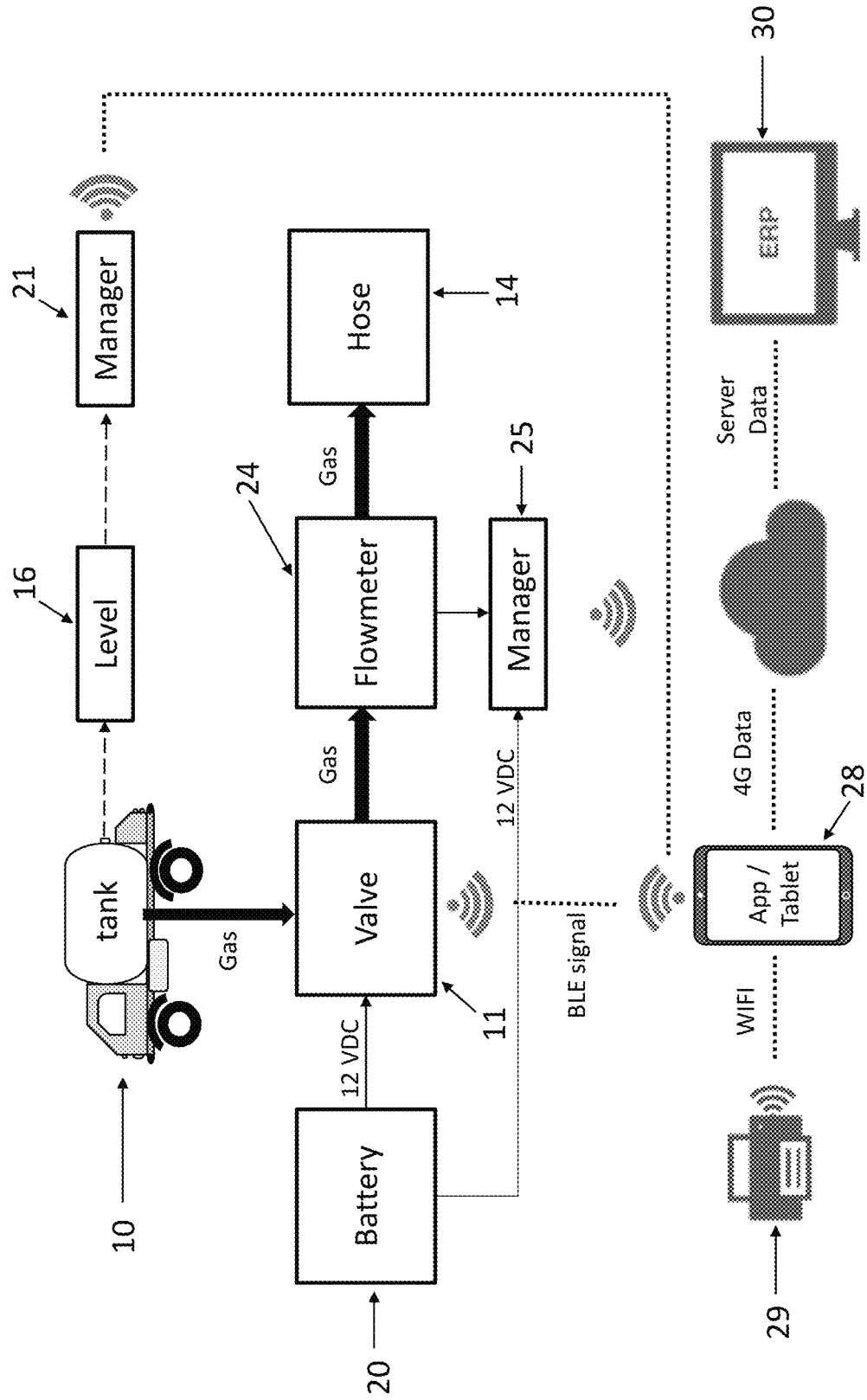
FIG. 2 shows a functional block diagram of the main elements of the invention.

From FIGS. 1, 2 it can be glimpsed that vehicle 10, which is the mobile unit which allows the safe transport of the fluid, upon having a steel reinforced tank placed over the truck, normally the tank is mechanically attached to the crossbars of the chassis of the truck; the tank has a filling port and an output port of fluid, with the relevant connections for such purpose; the tank in the central internal part from the longitude of the cylinder, over the vertical symmetry plan has a level 16 sensor which normally operates through a floater mechanically connected to a head with magnets, the dial which indicates the LPG level in liquid state inside the tank is in the external part of the tank and is not mechanically connected with the head, but it uses the electromagnetic field of the magnets to move the needle and show the percentage of liquid LPG inside the tank; so for its correct reading it is required that the tank is in the horizontal position, since a strong inclination can show an error in the reading of the level inside the tank; the said level 16 sensor has a Hall effect sensor attached in the dial, which allows to digitally capture the level of liquid LPG inside vehicle 10.

Vehicle 10 has at least a manual safety valve attached to the ducting in fluid communication with the output port, which allows to close the LPG flow towards hose 14, after the referred safety valve, downstream in the output line 17 there is a check valve which does not allow the reverse of LPG flow towards hose 14, in fluid communication downstream output line 17 just after the check valve, a solenoid valve 11 is placed, which is controlled remotely, such valve allows or denies the flow of fluid towards hose 14, downstream over the referred output line 17 after the solenoid valve 14, there is in fluid communication a flowmeter 24 which also has a digital output that allows digital readings of flow passing through the said output line, downstream ulterior the said flowmeter 24 it is placed fluidly a hose 14 which ends in a brass connector which couples with the entry port of the stationary tank; on a preferred embodiment, the hose is rolled over a reel which can be activated manually or thorough a mechanical, pneumatic or electric means; such reel is placed in the back part of vehicle 10.

In a preferred embodiment, the fluid communication in the output line 17 with the output port of the tank is done through steel tubes threaded with couplings or clamps which can be screwed or welded.

In a preferred embodiment, the digital output of level 16 sensor of vehicle 10 is electrically connected to a manager 21 which is integrated to an electronic card which received the signal from level 16 sensor, adapts it and, if necessary, transduces it in pulses or any other digital signal which can be sent remotely by means of an antenna, manager 21 includes as well a power source which can be directly fed to the electric system of 12 VCD from vehicle 10, or in an alternative embodiment can be connected to battery 20; manager 21 includes also an antenna 22 which allows to send digital signals upon distance in some known protocol, preferably using Bluetooth™ protocol since is the most common to find in mobile computing devices 28; but this does not restrict the possibility of using other communication protocol as xbee, zigbee, RF, etc. As well, the data obtained by level 16 sensor is processed and the signal is adapted to be sent by antenna 22 using the Bluetooth™ protocol and technology towards the mobile computing device 28, which is evident that has the capacity to send and receive data or signals through the referred Bluetooth™ protocol and technology. In a preferred embodiment the solenoid valve 11 placed in the output line of vehicle 10 if rom the normally closed type, the solenoid can preferably be activated in 12 VCD, even though there are valves with solenoids that can be activated from 5 VCD until 24 VCD, the implementation of the said solenoids and its valve will depend on design and cost parameters; meanwhile, the electronic card of manager 12 is capable to send a pulse of 12 VCD or activate some controlled switch as a triac, transistor or relay which receive a low-voltage control signal, let's say 15 VCD and the "high" part is electrically connected to a 12 VCD source, so when a low-voltage control signal is received, the "high" side is energized which electrically connects the solenoid to valve 11; manager 12 has an antenna 18 capable to receive signals under the Bluetooth™ protocol and technology, so when the mobile computing device 28 sends the control signal to manager 12 which in a preferred embodiment is encrypted, such signal will be received and processed by antenna 18 for later sending the information to a minicontroller, which on time will process the signal, instructions and data received by antenna 18, starting a decryption process which allows to determine if it must or must not activate the solenoid valve 11; if it is needed to open the solenoid valve 11, the microcontroller will send a signal via Bluetooth™ through the antenna 18 towards the mobile computing device 28 informing that the solenoid valve 11 is energized, also emits a control pulse towards de solenoid of valve 11, in a preferred embodiment the controller is capable to send signals in 12 VCD and thus the solenoid of valve 11 can be energized directly, in an alternative embodiment the signal will adapt to the voltage and current required to energize the solenoid of valve 11, either through amplifiers or through the abovementioned switches; on the contrary, if determining that the solenoid valve 11 must not be opened, it sends a message via Bluetooth™ to the mobile computing device 28 mentioning that the solenoid valve 11 was not activated, which causes that the display screen in the mobile computing device 28 shows an alert message to the operator of such situation.

In a preferred embodiment, the digital output of the flowmeter 24 placed over the output line 17 from vehicle 10 is electrically connected to a manager 25 which is composed by an electronic card that receives the signal from the flowmeter 24, adapts it and if needed, transduces it in pulses or in any other digital signal which can be sent remotely by an antenna, manager 25 as well has a power source which can be directly fed to the electrical system of 12 VCD from vehicle 10, or in an alternative embodiment can be connected to a battery 20; manager is also equipped with an antenna 26 which allows it to send digital signals from the distance within some known protocol, it is preferably used Bluetooth™ protocol since is the most commonly found in mobile computing devices 28; but this does not restrict the possibility of using other communication protocol as xbee, zigbee, RF, etc. As well, the data obtained by flowmeter 24 are processed and the signal is adapted to be sent by antenna 26 using the Bluetooth™ protocol and technology towards the mobile computing device 28, which is evident that has the capacity to send and receive data or signals through the referred Bluetooth™ protocol and technology.

The mobile computing device 28, in a preferred embodiment is a "tablet" wirelessly connected via WIFI and Bluetooth™, besides being able to accept chips from any mobile telephone company which enables it to use 3G, 4G, 5G or superior data networks, upon being able to communicate via mobile telephone data network must have the capability to generate a WIFI zone which allows to communicate, send data and control printer 29; as well, it must have means for geolocation via mobile telephone data network; RAM memory of at least 2 Gb. In an alternative embodiment it may be required within the services and characteristics that the mobile computing device 28 has a photo camera with a resolution of at least 8 pixels; in other alternative embodiment it is required that the mobile computing device 28 has means to match a remote collection device via credit/debit card, with the due relevant or provided programs by the banking institution which allow to make the charge or transfer of funds.

Central computing station 30 includes at least one computer device 40, preferably desktop and attached to a WIFI data network or mobile telephone data network (GSM, 3G, 4G, 5G or superior network), with which to maintain communication with the mobile computing device 28, the said desktop computing device 40 also has digital connection to a server or data server, capacity to run the system of this invention herein, as well as a computer program and relevant licenses of an inventory control system or "ERP"; also must have internet connection as well as a browser and office computer programs; preferably it is required a microprocessor, ports and capacity of WIFI or Ethernet connection for internet connection via a data service provider through a embodiment. The system also includes a method which runs the mobile computing device, which helps receiving the information from the level 16 sensor sent via Bluetooth™ through an antenna 22, as well as the information from the flowmeter 24 sent via Bluetooth™ through an antenna 26; as well as to send the instruction of opening or closing the solenoid valve 24 through the antenna 18; in a preferred embodiment the instructions for opening or closing the solenoid valve 24 coming from the mobile computing device 28 are encrypted, and thus the solenoid valve 11 can not be operated without the due process of encrypted signal within the manager 12 from the solenoid valve 11; in this embodiment, manager 12 as well as antenna 18 which electronically interact with solenoid valve 11 as mentioned above, are embedded in thermoset or thermoplastic resin creating a monolith, and so it is not possible to access the electronic card of manager 12 as well as antenna 18 without destroying its components and circuits; avoiding thus that they can be altered by any person.

Fluid supply, monitoring and control system in vehicles has two operation modalities, manual and automatic (upon request) embodiment.

In the manual embodiment, the operator introduces the password in the mobile computing device 28, and with this the system is unblocked, then the mobile computing device 28 sends via WIFI or mobile telephone data network (GSM, 3G, 4G, 5G or superior network) a requirement to discharge LPG fluid, together with the vehicle location data, vehicle identification number, operator number, operator security code (password), data regarding the amount to be charged or LPG volume to discharge in the stationary tank, among other relevant data that the specific gas or distribution company may require; in an alternative embodiment it may be required to the operator to identify using the biometric fingerprint reader, or send a picture from the house or the stationary tank to be filled, which can be done without problem using the services and characteristics of the mobile computing device 28; in any embodiment, central computing station 30 receives the data for its analysis, derived from this the discharge is either authorized or denied; in any case, sends authorization or denial data for the service back to the mobile computing device 28 via mobile telephone data network (DSM, 3G, 4G, 5G or superior network) preferably or in an alternative embodiment via WIFI in the event that the mobile computing device 28 is connected through it.

In any embodiment, the mobile computing device 28 receives the data with the authorization or denial for the discharge of LPG in a stationary tank; in case of authorization, it unlocks the "start of discharge button" set in the display of the mobile computing device 28, this one also processes the encryption of the signal for the activation of the solenoid valve 11, once encrypted the signal, the mobile computing device waits for the operator to push the "start of discharge button" to send via Bluetooth™ the encrypted signal, this signal is received by antenna 26 to be processed afterwards by manager 12 of the solenoid valve 11; once processed the signal and verified the authorization, manager 11 energizes the solenoid valve 12, which allows the flow of LPG from the vehicle to the stationary tank; once the mobile computing device 28 sends the encrypted signal via Bluetooth™, starts reading the data coming from level 16 sensor as well as flowmeter 24, whose transmission to the mobile computing device 28 has been discussed above; so, on starting the discharge of LPG from vehicle 10 to the stationary tank the data in real time are obtained in the mobile computing device 28, collating at all times the level of LPG liquid in vehicle 10 versus the readings in flowmeter 24, with this it can be certified that the flow of LPG extracted from vehicle 10 goes to the client's stationary tank, and thus this avoids charging and invoicing errors to the client, minimizes the risk of robbery or non-authorized unfair amount of charges to the client, besides being used as a security system, upon knowing that if the level of vehicle 10 does not match within certain scope of readings of flowmeter 24 the mobile computing device 28 send the order to close the solenoid valve 11, which, as it has been mentioned previously, is done through the mobile computing device 28, antenna 18 and manager 12 from solenoid valve 11; in such case the discharge of LPG from vehicle 10 to the client's stationary tank stops upon closing of the solenoid valve 11; which causes that the mobile computing device shows a display of error and an alarm, and thus the operator will have to apply the relevant revision and safety protocol, in order to avoid an incident.

If there are no discrepancies between the level 16 sensor and the flowmeter 24, the discharge continues until complying with the filling condition, which can be determined by amount of money or volume; in whichever case, the mobile computing device 28 issues the invoice or receipt automatically without intervention of the operator and gets ready to receive payment, which can be by credit card or cash; if it is done by credit/debit card, the mobile computing device 28 can process the collection/charge through a device and application set for that purpose, and so the mobile computing device 28 will receive the charge authorization and receive a notification that the transaction has been completed by the banking institution, or in an alternative embodiment when through the system receives confirmation from the operator that the cash payment has been done, stores the data in its memory, if there is a WIFI or mobile telephone data network connection (GSM, 3G, 4G, 5G or superior network), sends the data to central computing station 30 for processing and storage; thus, the accounting monetary amounts are updated, the information from the work order, LPG levels inside vehicle 10, besides inventories, among other relevant data which the gas company or distributor might require, are also updated.

In the automatic embodiment, the user or client has requested the LPG repost service on his stationary tank in 20 advance, in a preferred embodiment may have done it through a web page supported in central computing station 30, in which the user provides all the information as name, address, phone number, email, place in the address where the tank is located, capacity of it, amount of money to be reposted of LPG or desirable volume of recharge, among others, the web page system takes the data from the client and backs it up in a data base, analyzes them and proceeds to charge, which is made through a credit/debit card, through a program supported by a banking 25 institution which allows the charge through the web page; once the banking institution processes the charge/payment, sends a notification that the transaction has been successful, this is invoiced and the relevant receipt is issued to the client for the transaction, after that the central computing station lists the order which allows the creation of a supply route as well as an estimated arrival time for the completion of the recharge; once the orders for the day are set, the central computing station notifies the client via email, SMS or WhatsApp, with the information of the vehicle, 30 operators and estimated time of arrival.

Once the vehicle 10 is in the address provided by the user or client, the operator enters the password in the mobile computing device 28 to unlock it, then the mobile computing device 28 confirms been at the correct address where the discharge is to be made, retrieves from the internal memory the data of the number of order, amount to discharge (in money or volume) and activates the "start of discharge" button on the display.

In an alternative embodiment, the mobile computing device 28 sends via WIFI or mobile telephone data network (GSM, 3G, 4G, 5G or superior network) the information of location of the vehicle, identification number of the vehicle, operator number, operator security code (password), information of the order like number, amount to charge or LPG volume to charge in the stationary tank, among other relevant data which the specific gas company or distributor might request; in other alternative embodiment it can be required to the operator to identify himself using the fingerprint biometric reader, or send a picture from the house or the stationary tank to be filled, which can be done without problem using the services and characteristics of the mobile computing device 28; in any embodiment, central computing station 30 receives the data for its analysis, if the data of the order number geographic location, etc., are the correct ones, the discharge is authorized, if not, it is denied; in any case, the sending of authorization or denial of service data back to the mobile computing device 28 preferably via mobile telephone data network (GSM, 3G, 4G, 5G or superior network) or in an alternative embodiment via WIFI in the event that the mobile computing device 28 is connected through this.

In any alternative embodiment, the mobile computing device 28 receives the data with the authorization or denial for the discharge of LPG to the stationary tank which is located in the address of the order or at least in a geo-close nearby; which allows the unblock of the "start of discharge" button located in the display of the mobile computing device 28.

Once the "start of discharge" button located in the display of the mobile computing device 28 has been unlocked, the mobile computing device 28 processes the encryption of the signal for the activation of the solenoid valve 11, once encrypted the signal, the mobile computing device 28 waits until the operator pushes the start button to send the encrypted signal via Bluetooth™, the said signal is received by the antenna 26 to be processed afterwards by the manager 12 of the solenoid valve 11; once processed the signal and verified the authorization, manager 11 energizes the solenoid valve 12, which allows the flow of LPG from the vehicle to the stationary tank; once the mobile computing device 28 sends the encrypted signal via Bluetooth™, starts reading data from the level 16 sensor as well as from flowmeter 24, whose transmission towards the mobile computing device 28 has been discussed above; so, upon commencing a new discharge of LPG from vehicle 10 to the stationary tank, data in real time are obtained for the mobile computing device 28, which are collated and stored in its memory.

The mobile computing device 28 collates at all times the level of LPG liquid from vehicle 10 versus the flowmeter 24 readings, with this it is possible to prove that the LPG fluid extracted from vehicle 10 goes towards the client's stationary tank, in this embodiment, thanks to the characteristic and geolocation capability provided in the mobile computing device 28, it is a great certainty knowing that the correct stationary tank from the relevant client is been provided with LPG, invoicing is automatized, and as well it is provided some safety to the client that the volume of LPG agreed was deposited, as well as to provide a safe discharge of LPG fluid, upon knowing that if the mobile computing device 28 is not in a determined geographical zone (geo-close) which might deduct that the discharge is been done in the right place, or that vehicle 10 does not match within certain rank with the readings of flowmeter 24, sends the order to close the solenoid valve 11, which, as mentioned before, is done through a device from the mobile computing device 28, antenna 18 and manager 12 of the solenoid valve 11; in such case, the LPG discharge from vehicle 10 to the stationary tank of the client will stop upon closing of the solenoid valve 11; which causes that the mobile computing device 28 shows on display an error and alarm, and thus the operator will have to apply the relevant revision and safety protocol; in order to avoid an incident. If there are no discrepancies in the geo-close as well as among the level 16 sensor and flowmeter 24 readings, the discharge will continue until the filling condition is completed, which can be either by monetary amount or volume; in whichever case, the mobile computing device 28 issues the invoice or receipt automatically without intervention of the operator and sends a message via email, SMS or WhatsApp to the client with the information on the transferred volume of LPG, amount, day, time of commencement of discharge time of termination of discharge, month, year, unit number and operator number, among other relevant data for the client, the gas company or distributor, and besides the data are stored in its memory, in the event of having WIFI or mobile telephone data network (GSM, 3G, 4G, 5G or superior network) sends the data sent to the client to central computing station 30 for its process and storage; so the accounting monetary amounts are updated, the work order data, LPG levels inside the vehicle 10, as well as the inventories, among other relevant information which the gas company or distributor might need, are also updated.

In preferred modalities there are the following:

First embodiment. Monitoring and remote control system for the supplying of a fluid from a supplier source, the system includes: in the supply source of fluid, a fluid level gauge, an output line in fluid connection with a valve which allows the flow of fluid, a flowmeter which measures the amount of fluid flowing by the said output line; at least a mobile device with memory and processor, a mobile device capable to communicate wirelessly; a server with memory and a processor, the server in communication with at least one mobile device and the source; a first manager coupled to the fluid level gauge and in communication with at least one mobile device and the server; a second manager coupled to the valve and in communication with at least one mobile device and the server; a third manager coupled with the flowmeter and in communication with at least one mobile device and the server; where at least one mobile device and the server receive data from the first and third manager, and in response to the information received, the server or at least one mobile device sent at least one encrypted instruction to the second manager to activate the valve, where the second manager does not activate the valve without the reception of the encrypted instruction.

Second embodiment. The system of the first embodiment, where the data received are compared in the server and the mobile device since the beginning of the fluid supply from the source.

Third Embodiment. The system of the second embodiment, where in response to the comparison of data, it is determined to send at least one encrypted instruction to the second manager to activate the valve to interrupt the flow of fluid from the source.

Fourth embodiment. The system of the first embodiment, where the source additionally involves a means of communication in fluid connection to the said output line, the means of communication with the connector to couple with a required location.

Fifth embodiment. The system of the first embodiment, where the processor of at least one mobile device and the processor of the server are set to implement a fluid supply method which includes: receiving, on server, a fluid requirement which includes the amount or volume of fluid to supply, a required location and an identification number of the requirement, as well as information of the locations of supplying sources and information of their operators; approve or reject, at the server, the fluid supply, where the approval or rejection of the fluid supply is been sent, from the server to at least one mobile device; sends at least one encrypted instruction, from the server to the second manager, process and verify the encrypted signal of the second manager and act towards the valve to a position of fluid supply allowing the flow of fluid from the source to the requested location; receive, on at least one mobile device and the server, information received from the first and third manager from the gauge level and the flowmeter; to compare, on at least one mobile device and the server, the information received from the first and third manager according to the existing amount or volume and the supplied amount or volume; and to compare, in at least one mobile device and the server, the information received from the first manager with the information from the second manager; if the data from the first manager does not match or is not within the acceptable rank according to the data of the second manager, send, from at least one mobile device or the server, a signal to the second manager to activate the valve and close the flow of fluid from the source; display an error and/or alarm in at least one mobile device and the server; if the data from the first manager matches or is within the acceptable rank according to the data of the second manager, continue with the fluid supply until completing with the amount or volume to be supplied; and to send, from the server, a signal to the second manager to activate the valve closing the flow of fluid from the source one completed the amount or volume to be supplied.

Sixth embodiment. The system of the first embodiment, where the processor of at least one mobile device and the processor of the server are set to implement a fluid supply method which includes: receiving, on server, a requirement with at least information of a requested location and the amount or volume of fluid to supply; enlist the requirement to elaborate a route for the supplying source and estimate the time of the supply; notify, from the server, to a requester the information of the supplying source, the information of an operator of the supplying source and the estimated time of the supplying; to confirm that at least a mobile device is in the required location or in a geo-close near the requested location and recover the data of the requirement, and amount and volume of the fluid to be supplied; send the encrypted instruction from the server to the second manager and process the encrypted instruction to the second manager; to activate the valve in the supplying source in order to allow the flow of fluid towards the required location; to receive, in at least one mobile device and the server, the information received from the first and third manager from the level gauge and the flowmeter; to compare in at least one mobile device and the server, the data received from the first manager with the data received from the second manager; if the data from the first manager does not match or is not within the acceptable rank according to the data of the second manager, to send, from at least one mobile device or the server, a signal to the second manager to activate the valve and close the flow of fluid from the source; display an error and/or alarm in at least one mobile device and the server; if the data from the first manager matches or is within the acceptable rank according to the data of the second manager, continue the supply of fluid until completing the amount or volume to supply; to send, from the server, a signal to the second manager to activate the valve closing the flow of fluid from the source once completed he amount or volume to supply; and to send, from at least one mobile device or from the server a message to the requestor with the information of the supply. Seventh embodiment. The system of the sixth embodiment, where at least one mobile device sends to the server the information related to the source, identification number of the source, information of the operator, information of the requirement, amount or volume to supply.

Eighth embodiment. The system of the fifth or sixth embodiment, where the method also includes identifying the operator through at least one mobile device.

Ninth embodiment. The system of the fifth or sixth embodiment, where the method also includes sending, through at least one mobile device, a picture of the required location.

Tenth embodiment. The system from any of the modalities from seven to nine, where the method also includes analyzing in the server the information received from the requirement, authorize the supply if the information is correct and send authorization or rejection data to at least one mobile device.

Eleventh embodiment. The system of the tenth embodiment, where the method also includes receiving in at least one mobile device, the data with the authorization or rejection of the supply, and allow the supply if at least one mobile device is at the requires location or within the geo-close near to the required location.

Twelfth embodiment. A monitoring and remote control system for the supplying of a fluid coming from a supplying vehicle, the method includes: to receive, in a server, a requirement of fluid including the amount or volume of fluid to supply, a required location and an identification number of the requirement, and to receive information of the location of the supplying vehicles and information of the operators; to approve or reject, at the server, the supplying of fluid, where the approval or rejection of the fluid supply is sent, from the server to the mobile device; sent at least one encrypted instruction, from the server to the second manager which processes and sends an encrypted signal and activates a valve to the position of supplying of fluid allowing the flow of fluid from the vehicle to the required location; receive in the server, information from the first and third manager from a level gauge and flowmeter from the service vehicle; to compare with the server, the information received from the first and third manager according to the existing amount or value and the supplied amount or value; and to compare with the server, the information received from the first manager with the information received from the second manager; if the data from the first manager does not match or is not within the acceptable rank according to the data of the second manager, to send, from at least one mobile device or the server, a signal to the second manager to activate the valve and close the flow of fluid from the vehicle and display an error and/or alarm in the server; if the information from the first manager matches or is within the acceptable rank according to the information of the second manager, allow the continuation of the fluid supply until completing the amount or volume supplied; and to send, from the server, a signal to the second manager to activate the valve closing the flow of fluid from the vehicle once completed the amount or volume to be supplied.

Thirteenth embodiment. A method to supply a fluid from a supplying vehicle, the method includes: to receive, in a mobile device, a requirement of fluid supply including an amount or volume of fluid to supply, a required location and an identification number of the requirement; to receive at least one encrypted instruction, from a server to the second manager, where the second manager processes and verifies the encrypted signal and activates a valve towards a position of supply of fluid allowing the flow of fluid from the vehicle to the required location; send to the server, information from a first and third manager from a level gauge and flowmeter from a supply vehicle; to receive in at least one mobile device, a signal from the second manager to activate the valve and close the flow of fluid from the vehicle and allow that the valve remains in the supply position; and to receive a signal to the second manager to activate the valve closing the flow of fluid from the vehicle once completed the amount or volume to be supplied.

Unless previously defined herein, the terms and expressions used in this document must be understood with an ordinary sense given to such terms and expressions regarding their relevant areas of study, except, as previously mentioned, in those which have been previously defined. The relation terms such as above, under, first, second and similar can only be used to differentiate one entity or action from another, with no further need to necessarily imply a said relation or current order between such entities or actions. The terms "include" "contains" or any other variable of them are intended to make a non-exclusive inclusion such that a process, method, article, system, device or product including a list of elements do not include only those elements but can also include other elements which do not appear expressly or are not intrinsic to the process, method, article, system, device or product.

The brief description of the invention is provided to grant the reader with the technical nature of the description. It is provided in the understanding that it will not be used to interpret or limit the reach or meaning of the claims. Also, in the detailed description, several characteristics gathered in different modalities can be seen in order to provide a clear understanding of the description. This description form must not be interpreted as the reflex of an intention in which the claimed modalities require more characteristics than those expressly mentioned in each claim. On the contrary, as the following claims reflect, the inventive aspects fall in less than all the characteristics of a disclosed embodiment. Thus, the following claims are included in the detailed description, with each claim cited individually as matter to be claimed.

Meanwhile some of the aspects have been described in the context of a device, it is evident that these aspects also represent a description of the relevant method, where a block or device corresponds to a stage of procedure or a characteristic from a stage of procedure. As well, all the described aspect in the context from a step of the method represent a description of a relevant block or element or characteristic of a relevant device. Depending on certain requirements for implementation, the modalities of the invention can be implemented in a physical equipment or logic support. Implementation can be done using a digital storage means, for example, a flexible disc, DVD, CD, ROM, PROM, EPROM, EEPROM or FLASH memory, containing saved electronically readable control signals, that cooperate (or are able to cooperate) with a computer programmable system for the relevant method to be carried out.

According to the invention, some modalities include a data carrier which has electronically readable control signals, which are able to cooperate with a computer programmable system for one of the methods described in this document to be carried out.

In general, the modalities of this invention can be implemented as a product of computer program with a program code, the program code which is operative to carry out one of the methods, when the product of the computer program is executed in a computer. The program code can be, for example, saved in a portable readable per each device.

Even though the previous description has been described with the best modalities and/or other examples, it is understood that several modifications can apply or can be done to the same and that the matter described in this document can be implemented in different forms and examples, and that such concepts can be carried out in different applications, some of which have been previously described. The following claims are destined to call for any and all of the applications, modifications and variations falling within the reach of the concepts herein mentioned.

Having described this invention with enough detail to enable a technician understanding the matter for its reproduction it is found with a high degree of industrial application, as well as inventive activity, so it is important to mention that the said technician understanding the matter can foreseen alternative modalities for this invention which might be considered within the reach and spirit of the following.

The invention claimed is:

1. A monitoring and remote control system for supplying a fluid from a vehicle to a stationary tank to be supplied or refueled with said fluid, the monitoring and remote control system comprising:
   a vehicle having a tank with a fluid level sensor and an output line;
   the output line having: a solenoid valve configured to allow or deny the flow of the fluid through said output line, a flowmeter configured to measure the amount of the fluid flowing through said output line, a connector on a distal end of said output line, the connector configured to couple with an entry port of the stationary tank;
   at least one mobile computing device configured for wireless communication and having a memory and a processor;
   a central computing station having at least one computer device configured for wireless communication with the at least one mobile computing device;
   a first manager having hardware, software, power supply, an antennae module and switching means and coupled with the solenoid valve and configured for wireless communication with the at least one mobile computing device;
   a second manager having hardware, software, an antennae module, and a power supply, and coupled with the flowmeter and configured for wireless communication with the at least one mobile computing device;
   a third manager having hardware, software, an antennae module, and a power supply and coupled to the fluid level sensor and configured for wireless communication with the at least one mobile computing device;
   wherein at least one mobile computing device is configured to send an authorization request to the central computing station to allow the fluid to flow from the vehicle tank to the stationary tank, and in response the central computing station is configured to grant or deny authorization;
   wherein the central computing station computer device sends the request response to the at least one mobile computing device;
   wherein if the request is authorized, the at least one mobile computing device activates the solenoid valve by means of an encrypted signal which is sent to the first manager which decrypts the signal and activates the switching means that energize the solenoid valve allowing the flow of fluid from the vehicle tank to the stationary tank;
   wherein the second manager sends fluid flow readings provided by the flowmeter to the at least one mobile computing device;
   wherein the third manager sends vehicle tank fluid level readings provided by the level sensor to the at least one mobile computing device;
   wherein the flowmeter readings provided by the second manager and vehicle tank fluid level sensor provided by the third manager are received in real time by the at least one mobile computing device as a security system configured to ensure the fluid withdrawn from the vehicle tank is placed in the stationary tank without diversion or leakage while the fluid is supplied from the vehicle tank to the stationary tank.

2. The monitoring and remote control system of claim 1, wherein the flow of fluid from the vehicle to the stationary tank continues until a filling condition is met, as determined by an amount of money or volume.

3. The monitoring and remote control system of claim 1, wherein the at least one mobile computing device further comprises at least one of the following: a screen, a battery, a processor, a wireless communication capability, a photographic capability, a GPS (Global Positioning System) capability, and a fingerprint biometric reader capability.

4. The monitoring and remote control system of claim 3, wherein the request for authorization sent by the at least one mobile device to the central computing station comprises sending at least one of the following data: a GPS location data of the stationary tank, an identification number of the stationary tank, an information of the operator, a requirement data, and an amount or a volume to be supplied.

5. The monitoring and remote control system of claim 3, wherein the request for authorization sent by the at least one mobile device to the central computing station comprises sending at least one of the following: biometric data of the operator or a pictures of the operator or a picture of the location of the stationary tank.

6. A monitoring and remote control system for supplying a Liquid Petroleum Gas (LPG) from a tank-vehicle to a stationary tank, to be supplied or refueled with LPG, the system comprising:
- a tank vehicle that comprises: tank LPG level sensor and a tank output line;
- the tank output line having: a solenoid valve configured to allow or deny the flow of the fluid through said output line, a flowmeter configured to measure the amount of the fluid flowing through said output line, a connector on a distal end of said output line, the connector configured to couple with an entry port of the stationary tank;
- at least one mobile computing device configured to wirelessly communicate, having a memory and a processor;
- a central computing station having at least one computer device configured to wirelessly communicate with the at least one mobile computing device;
- a server with a memory and processor, the server supports a digital connection to the computer device of the central computing station;
- a first manager having hardware, software, power supply, an antennae module and switching means and coupled with the solenoid valve and configured to wirelessly communicate with the at least one mobile computing device;
- a second manager having hardware, software, an antennae module, and a power supply, and coupled with the flowmeter and configured to wirelessly communicate with the at least one mobile computing device;
- a third manager having hardware, software, an antennae module, and a power supply and coupled to the fluid level sensor and configured to wirelessly communicate with the at least one mobile computing device;
- wherein at least one mobile computing device sends an authorization request to the central computing station to allow LPG to flow from the tank-vehicle to the stationary tank; and in response the central computing station grants or denies authorization;
- wherein the central computing station computer device sends the request response to the at least one mobile computing device;
- wherein if the request is authorized, the at least one mobile computing device activates the solenoid valve by means of an encrypted signal which is sent to the first manager which decrypts the signal and activates the switching means that energize the solenoid valve allowing the flow of LPG from the vehicle tank to the stationary tank;
- wherein the second manager sends LPG flow readings provided by the flowmeter to the at least one mobile computing device;
- wherein the third manager sends vehicle tank fluid level readings provided by the level sensor to the at least one mobile computing device;
    - wherein the flowmeter readings provided by the second manager and tank-vehicle LPG level sensors provided by the third manager are received in real time and are compared to each other in real by the at least one mobile computing device time as a security system configured to ensure the fluid withdrawn from the vehicle tank is placed in the stationary tank without diversion or leakage while the fluid is supplied from the vehicle tank to the stationary tank.

7. The monitoring and remote control system of claim 6, wherein the flow of LPG from the tank-vehicle to the stationary tank continues until a filling condition is met, as determined by an amount of money or volume.

8. The monitoring and remote control system of claim 6, wherein the at least one mobile computing device further comprises at least one of the following: a screen, a battery, processor, wireless communication capability, photographic capability, GPS (Global Positioning System) capability, fingerprint biometric reader capability.

9. The monitoring and remote control system of claim 8, wherein the request for authorization sent by the at least one mobile device to the central computing station comprises sending at least one of the following data: GPS location data of the stationary tank, identification number of the stationary tank, information of the operator, requirement data, amount or volume to be supplied.

10. The monitoring and remote control system of claim 8, wherein the request for authorization sent by the at least one mobile device to the central computing station comprises sending at least one of the following: biometric data of the operator or a pictures of the operator or a picture of the location of the stationary tank.

* * * * *